US008235570B2

(12) United States Patent
Okubo et al.

(10) Patent No.: US 8,235,570 B2
(45) Date of Patent: Aug. 7, 2012

(54) VEHICLE HEADLAMP

(75) Inventors: Yasuhiro Okubo, Isehara (JP); Toshiya Abe, Isehara (JP)

(73) Assignee: Ichikoh Industries, Ltd., Tokyo (JP)

(*) Notice: Subject to any disclaimer, the term of this patent is extended or adjusted under 35 U.S.C. 154(b) by 247 days.

(21) Appl. No.: 12/645,076

(22) Filed: Dec. 22, 2009

(65) Prior Publication Data

US 2010/0165654 A1 Jul. 1, 2010

(30) Foreign Application Priority Data

Dec. 26, 2008 (JP) ................................ 2008-333183

(51) Int. Cl.
*B60Q 1/00* (2006.01)

(52) U.S. Cl. ......................... 362/539; 362/512; 362/514

(58) Field of Classification Search .................. 362/539, 362/512, 514
See application file for complete search history.

(56) References Cited

U.S. PATENT DOCUMENTS

| | | | | |
|---|---|---|---|---|
| 6,513,958 | B2 * | 2/2003 | Ishikawa | 362/466 |
| 6,543,910 | B2 * | 4/2003 | Taniuchi et al. | 362/297 |
| 6,607,295 | B2 | 8/2003 | Hayakawa | |
| 7,008,093 | B2 * | 3/2006 | Fukawa et al. | 362/539 |
| 7,311,430 | B2 | 12/2007 | Tsukamoto et al. | |
| 7,334,926 | B2 * | 2/2008 | Takada | 362/517 |
| 7,370,996 | B2 * | 5/2008 | Ohshio | 362/539 |
| 7,901,121 | B2 * | 3/2011 | Ohshio et al. | 362/512 |
| 2002/0089853 | A1 * | 7/2002 | Taniuchi et al. | 362/297 |
| 2003/0090906 | A1 * | 5/2003 | Hayakawa | 362/517 |
| 2004/0213012 | A1 * | 10/2004 | Fukawa et al. | 362/539 |
| 2005/0152151 | A1 * | 7/2005 | Lisowski et al. | 362/513 |
| 2005/0270792 | A1 * | 12/2005 | Suzuki | 362/517 |
| 2007/0086202 | A1 | 4/2007 | Tsukamoto et al. | |
| 2008/0112180 | A1 * | 5/2008 | Okada | 362/518 |
| 2008/0266889 | A1 * | 10/2008 | Suzuki | 362/512 |

FOREIGN PATENT DOCUMENTS

| | | | |
|---|---|---|---|
| JP | 63-111704 | U | 7/1988 |
| JP | 2000-215717 | A | 8/2000 |
| JP | 2002-324413 | A | 11/2002 |
| JP | 2007-109493 | A | 4/2007 |

* cited by examiner

*Primary Examiner* — David Crowe
*Assistant Examiner* — Bryon T Gyllstrom
(74) *Attorney, Agent, or Firm* — Foley & Lardner LLP

(57) ABSTRACT

A vehicle headlamp is provided with: a main reflector having a convergent reflecting surface; a semiconductor-type light source; a projecting lens; an auxiliary reflector having a parabolic reflecting surface; a shade and a light shading member that are structured integrally with each other; and a switching device. By means of the switching device, the shade and light shading member, which are structured integrally with each other, are switched and positioned in a first location and a second location, thereby allowing light distribution patterns for high and low beams to be switched and illuminated toward a forward direction of a vehicle. As a result, the vehicle headlamp becomes capable of achieving downsizing, weight reduction, power saving, and cost reduction.

8 Claims, 8 Drawing Sheets

VEHICLE HEADLAMP

CROSS-REFERENCE TO RELATED APPLICATIONS

This application claims priority of Japanese Patent Application No. 2008-333183 filed on Dec. 26, 2008. The contents of this application are incorporated herein by reference in their entirety.

BACKGROUND OF THE INVENTION

1. Field of the Invention

The present invention relates to a vehicle headlamp of a projector type, employing a semiconductor-type light source to illuminate light to a forward direction of a vehicle by switching a light distribution pattern having one or more cutoff lines (light distribution pattern for low beam, light distribution pattern for passing) and a light distribution pattern for high beam (light distribution pattern for cruising).

2. Description of the Related Art

A vehicle headlamp of this type is conventionally known (Japanese Laid-open Patent Application No 2007-109493, for example). Hereinafter, a conventional vehicle headlamp will be described. The conventional vehicle headlamp is made up of a first light source unit forming a light distribution pattern for low beam; and a second light source unit forming a light distribution pattern for high beam. The first light source unit is a projector-type lamp unit, and is provided with: a light source (light emitting diode); an elliptical (convergent) reflector; a shade; and a projecting lens. In addition, the second light source unit is a projector-type lamp unit, and is provided with: a light source (light emitting diode); an elliptical (convergent) reflector; and a projecting lens. Hereinafter, functions of the conventional headlamp will be described. When the light source of the first light source unit is lit, the light emitted from the light source is reflected by means of the reflector; a part of the reflected light is cut off by means of the shade; a light distribution pattern having an oblique cutoff line and a horizontal cutoff line, i.e., a light distribution pattern for low beam is formed; and the light distribution pattern for low beam is longitudinally and transversely inverted from the projecting lens, and illuminated (projected) to a forward direction of a vehicle. In addition, when the light source of the second light source unit is lit, the light emitted from the light source is reflected by means of the reflector, and the reflected light is longitudinally and transversely inverted from the projecting lens, and is illuminated (projected) toward the forward direction of the vehicle, as a light distribution pattern for high beam.

Again, the conventional vehicle headlamp is made of: the first light source unit having the light source, the reflector, a shade, and the projector lens; and the second light source unit having the light source, the reflector, and the projector lens. Thus, the conventional vehicle headlamp requires a large number of components and the second light source unit for a light distribution pattern for high beam, and entails problems concerning downsizing, weight reduction, power saving, and cost reduction, accordingly.

The projector-type vehicle headlamps of this kind, using power discharge bulbs, halogen electric bulbs, metal halide lamps, or light source bulbs as light sources, are conventionally known (Japanese Laid-open Patent Application Nos. 2002-324413 and 2000-215717 and Japanese Laid-open Utility Model Application No. 63-111704, for example). However, the conventional vehicle headlamps use power discharge bulbs, halogen electric bulbs, metal halide lamps, or light source bulbs as light sources, thus allowing light from the light sources to be radiated in a direction of 360 degrees with respect to a reference axis (optical axis, reflecting surface axis, lens axis). Therefore, the conventional projector-type vehicle headlamps provide reflecting surfaces (reflectors) for reflecting the radiated light from the light sources in the direction of 360 degrees with respect to the reference axis, thus increasing spaces for constituent elements, and entails downsizing as in the above-described conventional vehicle headlamp.

The present invention has been made to solve problems concerning downsizing, weight reduction, power saving, and cost reduction, which could arise due to the fact that the conventional vehicle headlamp requires the second light source unit for a light distribution pattern for high beam.

SUMMARY OF THE INVENTION

A first aspect of the present invention is directed to a vehicle headlamp, comprising:

(i) a main reflector having a convergent reflecting surface based upon an elliptical face;

(ii) a semiconductor-type light source which is disposed so that a light emitting chip is positioned at or near a first focal point of the convergent reflecting surface;

(iii) a projecting lens on which a lens focal point is positioned at or near a second focal point of the convergent reflecting surface;

(iv) an auxiliary reflector which is disposed between the main reflector and the projecting lens;

(v) a parabolic reflecting surface based upon a parabolic face, which is disposed at the auxiliary reflector and on which a focal point is positioned at or near the first focal point of the convergent reflecting surface, for reflecting radiated light from the semiconductor-type light source, which is disallowed to be targeted for light distribution on the convergent reflecting surface, as a spot light distribution of the light distribution pattern for high beam, without passing through the projecting lens;

(vi) a shade which is between the semiconductor-type light source and the projecting lens, and is disposed to be movable between a first location and a second location, for cutting off a part of reflection light radiated from the semiconductor-type light source and reflected on the convergent reflecting surface, to thereby form a light distribution pattern having one or more cutoff lines, when the shade is positioned in the first location, and for forming a basic light distribution of the light distribution pattern for high beam by means of the reflection light radiated from the semiconductor-type light source and reflected on the convergent reflecting surface, when the shade is positioned in the second location;

(vii) a light shading member which is between the semiconductor-type light source and the auxiliary reflector, and is disposed to be movable between a first location and a second location, for shading the radiated light from the semiconductor-type light source, which is to be incident to the parabolic reflecting surface, when the light shading member is positioned in the first location, and for allowing the radiated light from the semiconductor-type light source to be incident to the parabolic reflecting surface, when the light shading member is positioned in the second location; and (viii) a switching device for switching the shade and the light shading member to the first location and the second location respectively, thereby switching a current light distribution pattern to a respective one of a light distribution pattern, having one or more cutoff lines, and a light distribution pattern for high beam, having a spot light distribution.

A second aspect of the present invention is directed to the vehicle headlamp according to the first aspect, wherein:

the semiconductor-type light source is disposed so that a normal line passing through a center of a light emitting chip is orthogonal to a reference axis;

the main reflector is disposed so that radiated light in a hemispherical direction from the light emitting chip is incident to the convergent reflecting surface; and the switching device is disposed in opposite to the main reflector in a state in which the semiconductor-type light source is sandwiched therebetween.

A third aspect of the present invention is directed to the vehicle headlamp according to the first aspect, wherein:

the shade and the light shading member are structured integrally with each other; and are disposed to be rotationally movable between the first location and the second location around an axis which is parallel to an axis orthogonal to a normal line and a reference axis passing through a center of the light emitting chip, and which is positioned in a direction a first focal point on the convergent reflecting surface from a second focal point on the convergent reflecting surface.

A fourth aspect of the present invention is directed to a vehicle headlamp, comprising:

(i) a light source from which light is radiated in a hemispherical direction;

(ii) a convergent main reflector which is disposed to allow the radiated light in the hemispherical direction from the light source to be incident thereto;

(iii) a projecting lens on which a lens focal point is positioned in or near a focal point of the main reflector;

(iv) a parabolic auxiliary reflector which is disposed between the main reflector and the projecting lens;

(v) a shade and a light shading member which are disposed to be movable between a first location and a second location in between the light shade and the light shading member;

(vi) a switching device for switching the shade and the light shading member to the first location and the second location respectively, thereby switching a current light distribution pattern to a respective one of a light distribution pattern having one or more cutoff lines and a light distribution pattern for high beam, wherein:

when the shade and the light shading member are positioned in the first location by means of the switching device, the light shading member is adapted to shade the radiated light from the light source, to be incident to the auxiliary reflector, and the shade is allowed to illuminate the light distribution pattern having one or more cutoff lines, which is formed by cutting off a part of reflection light radiated from the light source and reflected on the main reflector, toward a forward direction of a vehicle; and when the shade and the light shading member are positioned in the second location by means of the switching device, the shade and the light shading member move from the first location to the second location, to thereby ensure that:

the reflected light from the main reflector, which is cut off by means of the shade in the first location, is incident to the projecting lens, as a basic light distribution of the light distribution pattern for high beam, without being cut off by means of the shade;

the radiated light from the light source, which is shaded by means of the light shading member in the first location, is incident to the auxiliary reflector, without being shaded by means of the light shading member; and the radiated light from the light source, which is incident to the auxiliary reflector and is disallowed to be targeted for light distribution on the main reflector, is reflected by means of the auxiliary reflector to the forward direction of the vehicle, as a spot light distribution of the light distribution pattern for high beam, without passing through the projecting lens.

A fifth aspect of the present invention is directed to the vehicle headlamp according to the fourth aspect, wherein:

the semiconductor-type light source is disposed so that a normal line passing through a center of the light emitting chip is orthogonal to a reference axis; and the switching device is disposed in opposite to the main reflector in a state in which the semiconductor-type light source is sandwiched therebetween.

A sixth aspect of the present invention is directed to the vehicle headlamp according to the fourth aspect, wherein:

the shade and the light shading member are structured integrally with each other; and are disposed to be rotationally movable between the first location and the second location around an axis which is parallel to an axis orthogonal to a normal line and a reference axis passing through a center of the light emitting chip and is positioned in a direction a first focal point on the convergent reflecting surface from a second focal point on the convergent reflecting surface.

A seventh aspect of the present invention is directed to the vehicle headlamp according to the fourth aspect, wherein:

the shade allows an edge to be provided to form:

an oblique cutoff line with an upward gradient from an elbow point to a cruising lane side;

an upper horizontal cutoff line which is horizontal from the oblique cutoff line to the cruising lane side; and a lower horizontal cutoff line which is horizontal to the elbow point to an opposite lane side.

An eighth aspect of the present invention is directed to the vehicle headlamp according to the fourth aspect, wherein:

the shade and the light shading member are formed in an integral structure having optically opaque properties, and are constituted to rotationally move at a relatively small rotational angle in the first location and the second location in between the light source and the projecting lens by means of the switching device;

the light shading member is disposed at the auxiliary reflector side, and is formed in a ring shape so that the reflected light from the main reflector is disallowed to be hindered from being incident to the projecting lens; and the shade is disposed in a location which is opposite to the light shading member.

The vehicle headlamp according to the first aspect of the present invention is provided in such a manner that: by means for solving the above-described problem, when the shade and the light shading member are switched and positioned in the first location, the radiated light from the light emitting chip is reflected on the convergent reflecting surface and converges near the second focal point (focal point of the projecting lens) of the convergent reflecting surface; and a part of the reflected convergent light is then cut off by means of the shade; and the remaining reflected convergent light is illuminated toward the forward direction of the vehicle from the projecting lens, as a light distribution pattern having one or more cutoff lines. At this time, the radiated light from the semiconductor-type light source, which is disallowed to be targeted for light distribution on the convergent reflecting surface, is shaded by means of the light shading member, and is disallowed to be incident to the parabolic reflecting surface of the auxiliary reflector. In addition, when the shade and the light shading member are switched and positioned in the second location by means of the switching device, the radiated light from the light emitting chip, followed by the reflected convergent light being reflected on the convergent reflecting surface and converging near the second focal point (focal point of the projecting lens) of the convergent reflecting surface, is illuminated toward the forward direction of the vehicle from the projecting lens, as the basic light distribution of the light distribution pattern for high beam, without being cut off by means of the shade. At this time, the radiated light from the semiconductor-type light source, which is disallowed to be targeted for light distribution on the convergent reflecting surface, is incident to, and is reflected on, the parabolic reflecting surface of the auxiliary reflector, without being shaded by means of the light shading member. The reflected light is illuminated toward the forward direction of the vehicle, as the spot light distribution of the light distribution pattern for high beam, without passing through the projecting lens. In this manner, the vehicle headlamp according to the first aspect of the present invention employs a semiconductor-type light source as a light source, thus allowing the light distribution pattern having one or more cutoff lines and the light distribution pattern for high beam to be switched and illuminated toward the forward direction of the vehicle.

In addition, the vehicle headlamp according to the first aspect of the present invention is made of: the main reflector having the convergent reflecting surface; the semiconductor-type light source; the projecting lens; the auxiliary reflector having the parabolic reflecting surface; the shade: the light shading member; and the switching device. Therefore, in comparison with the conventional vehicle headlamp, the number of components is reduced without requiring the second light source unit for high-beam light distribution pattern; and downsizing, weight reduction, and cost reduction can be achieved accordingly.

Moreover, the vehicle headlamp according to the first aspect of the present invention utilizes the reflected convergent light that has been cut off by means of the shade so far, to thereby form the basic light distribution of the light distribution pattern for high beam. This headlamp also effectively utilizes the radiated light from the semiconductor-type light source, which is disallowed to be targeted for light distribution on the convergent reflecting surface by means of the parabola reflecting surface of the auxiliary reflector, to thereby form the spot light distribution of the light distribution pattern for high beam. As a result, the vehicle headlamp according to the first aspect of the present invention is capable of obtaining the light distribution pattern for high beam with its superior distant visibility. This headlamp is also capable of obtaining the sense of moderation in switching between the light distribution pattern for low beam, having the cutoff lines, and the light distribution pattern for high beam.

In addition, the vehicle headlamp according to the second aspect of the present invention is provided in such a manner that: by means for solving the above-described problem, a portion in the hemispherical direction, which is opposite to that of the radiated light from the semiconductor-type light source in a state in which the semiconductor-type light source is sandwiched therebetween, is allowed to be an unnecessary portion where no components are present; and the entire vehicle headlamp can be further downsized, in spite of a bi-functional vehicle headlamp for switching light distribution patterns, by disposing the switching device at that portion.

Further, the vehicle headlamp according to the third aspect of the present invention is provided in such a manner that: by integrally structuring the shade and the light shading member with each other, the number of components can be further reduced; and moreover, the switching device for switching the shade and the light shading member to each other can be used all together. Therefore, the number of components can be further reduced, and downsizing, weight reduction, power saving, and cost reduction can be achieved accordingly.

Moreover, the vehicle headlamp according to the third aspect of the present invention allows the shade and light shading member, which are structured integrally with each other, to be disposed to be rotationally movable between the first location and the second location in a backside location (the location close to the first focal point of the convergent reflecting surface), with respect to the Z-axis direction from the second focal point (lens focal point of the projecting lens) of the convergent reflecting surface. Thus, even if a rotational angle is small between the shade and the light shading member, which are structured integrally with each other, the rotational movement quantity increases at a portion at the side of the second focal point (lens focal point of the projector lens) of the convergent reflecting surface of the shade, namely at a portion of the edge forming the cutoff lines of the light distribution pattern for low beam. As a result, the vehicle headlamp according to the third aspect of the present invention is provided in such a manner that, even if the shade is rotated at a small rotational angle, the reflected convergent light is allowed to be reliably cut off or pass through the projector lens without being cut off. In this manner, the vehicle headlamp according to the third aspect of the present invention makes compact and inexpensive the switching device for rotating the shade and light shading member, which are structured integrally with each other; and therefore, downsizing and cost reduction can be achieved accordingly.

DESCRIPTION OF THE PREFERRED EMBODIMENT

Figure 1:
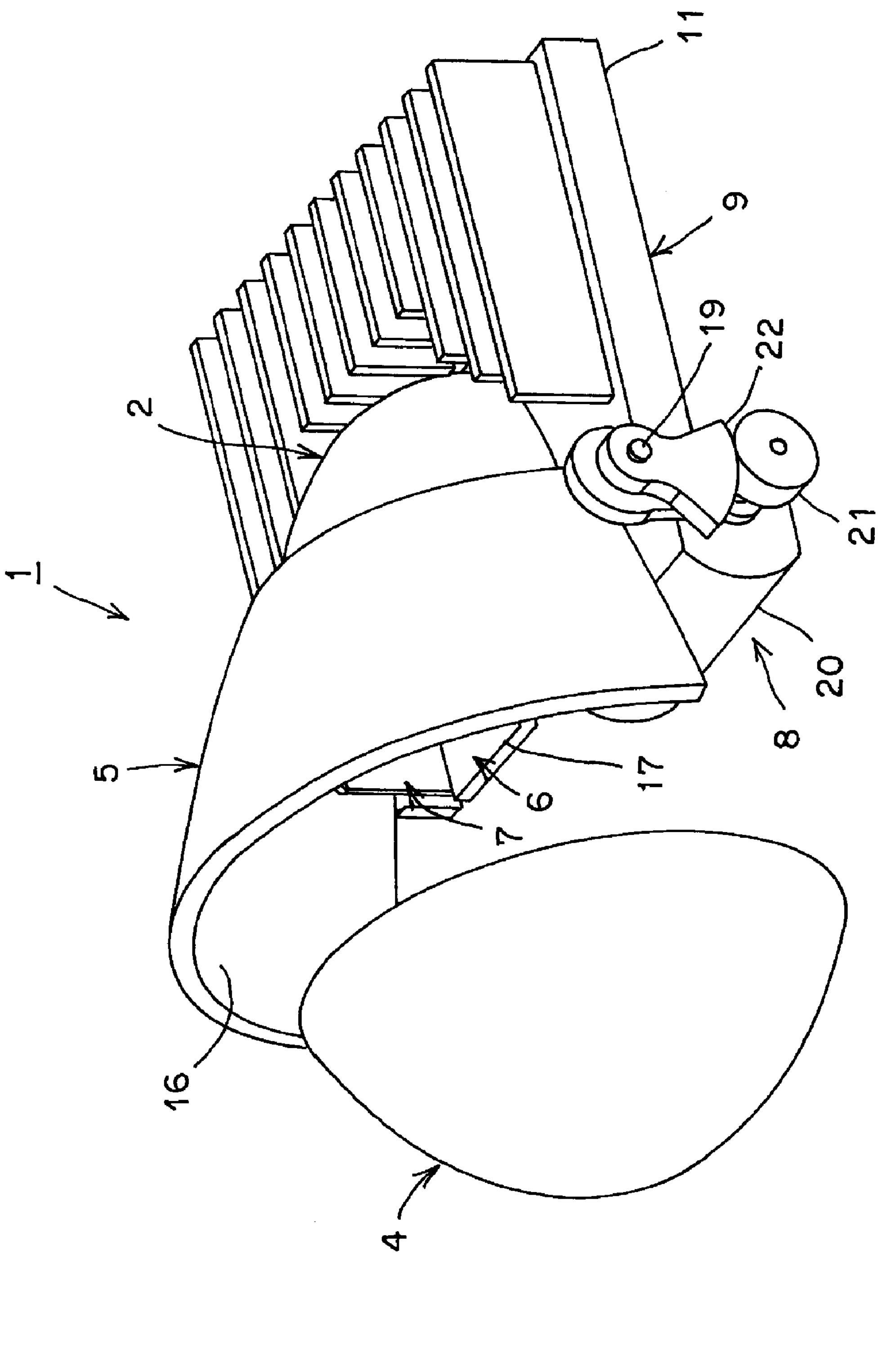
FIG. 1 is a perspective view of the essential parts showing an embodiment of a vehicle headlamp according to the present invention.

Hereinafter, the embodiment of a vehicle headlamp according to the present invention will be described with referring to the drawings. The present invention is not limited by these embodiments. In the drawings, letter sign "VU-VD" designates a vertical line of a top and a bottom of a screen; and the letter sign "HL-HR" designates a horizontal line of a left and a right of the screen. In the specification and claims, the terms "top", "bottom", "front", "rear", "left", and "right" designate the top, bottom, front, rear, left, and right of a vehicle when the vehicle headlamp according to the present invention is mounted on a vehicle (automobile).

Embodiment

Hereinafter, a constitution of the vehicle headlamp of the first embodiment will be described. In the figures, reference numeral 1 designates a vehicle headlamp (automobile headlamp) of the first embodiment. The vehicle headlamp 1 is a vehicle headlamp for left-side cruising lane. A vehicle headlamp for right-side cruising lane is transversely reversed in the vehicle headlamp 1 for left-side cruising lane. In addition, in FIG. 2, the X, Y, and Z axes constitute an orthogonal coordinate system (X-Y-Z orthogonal coordinate system). The X axis corresponds to a leftward-rightward horizontal axis and a cruising lane side. In other words, in the first embodiment, the left side L corresponds to a positive direction and the right side R corresponds to a negative direction. In addition, the Y axis corresponds to an upside-downside vertical axis, and in the first embodiment, the upside U corresponds to a positive direction and the downside D corresponds to a negative direction. Further, the Z axis corresponds to an axis in a forward/backward direction which is orthogonal to the X axis and the Y axis, and in the first embodiment, the foreside F corresponds to a positive direction, and the backside B corresponds to a negative direction.

Figure 8:
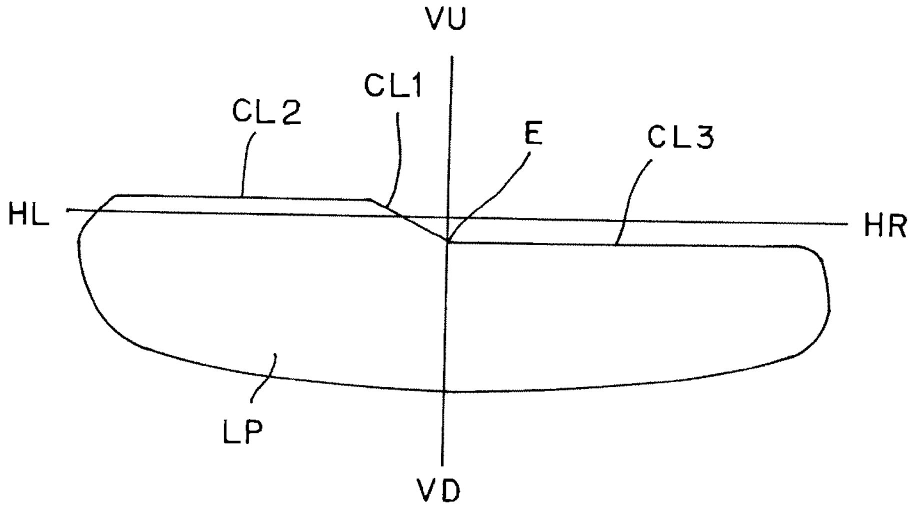
FIG. 8 is an explanatory view showing a light distribution pattern for low beam, similarly.
Figure 9:
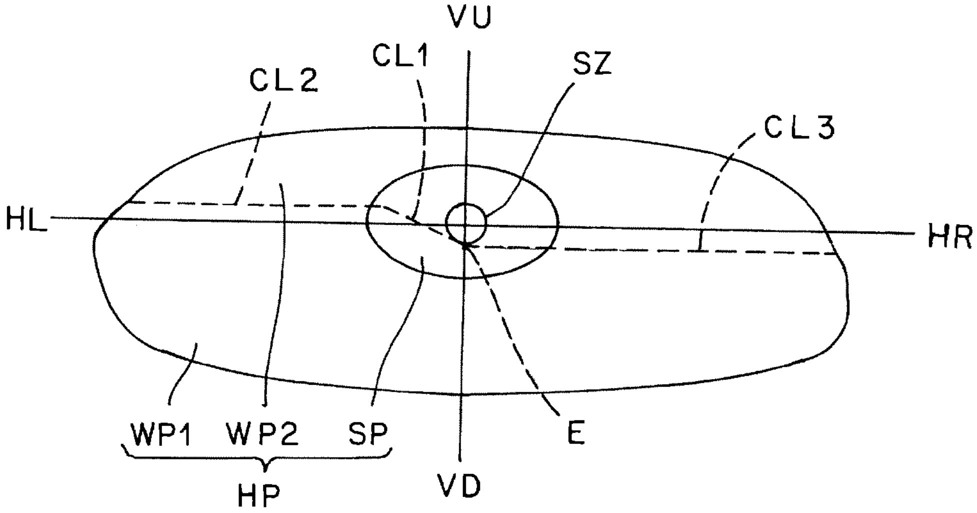
FIG. 9 is an explanatory view showing a light distribution pattern for high beam, similarly.

The vehicle headlamp 1 is intended to illuminate: a light distribution pattern having one or more cutoff lines, shown in FIG. 8, and a light distribution pattern for high beam (light distribution pattern for cruising) HP, shown in FIG. 9, toward a forward direction of a vehicle (not shown). The light distribution pattern having the cutoff lines, shown in FIG. 8, is a light distribution pattern having one or more cutoff lines (Z cutoff lines) made of: an oblique cutoff line CL1 of an upward gradient from an elbow point E toward a cruising lane (left-side); an upward horizontal cutoff line CL2 which is horizontal from the oblique cutoff line CL1 toward a cruising lane side; and a lower horizontal cutoff line CL3 which is horizontal from the elbow point E to an opposite lane side (right side), for example, a light distribution pattern for low beam (light distribution pattern for passing) LP. An angle formed between the oblique cutoff line CL1 and a horizontal line HL-HR of a screen is about 15-35 degrees. In addition, the elbow point E is on an upside-downside vertical line VU-VD; is downward with respect to a left-right horizontal line HL-HR; and is a crossing point between the oblique cutoff line CL1 and the lower horizontal cutoff line CL3.

The vehicle headlamp 1 is made up of: a main reflector 2; a semiconductor-type light source 3; a projecting lens 4; an auxiliary reflector 5; a shade 6; a light shading member 7; a switching device 8; a heat sink member 9; and a lamp housing and a lamp lens, although not shown (such as a transparent outer lens, for example).

The main reflector 2, the semiconductor-type light source 3, the projecting lens 4, the auxiliary reflector 5, the shade 6, the light shading member 7, the switching device 8, and the heat sink member 9 are members constituting a lamp unit. The members 3, 4, 5, 6, 7, 8, 9 constituting the lamp unit are disposed to be optical-axis adjustable vertically around a horizontal axis and horizontally around a vertical axis via an optical axis adjustment mechanism, for example, in a lamp room partitioned by the lamp housing and the lamp lens. In the lamp room, there may be disposed other lamp units such as a fog lamp, a cornering lamp, a clearance lamp, and a turn signal lamp other than the abovementioned members 2, 3, 4, 5, 6, 7, 8, 9 constituting the lamp unit.

The heat ink member 9 is made up of: a front portion 10 having a fixing face on a top face thereof; and a rear portion 11 shaped like a fin at an upper part thereof. The heat sink member 9 is made up of a resin member or a metal member with its high thermal conductivity, for example.

The main reflector 2 is made up of a resin member or a metal member with optically opaque properties and high thermal conductivity, and is fixed to the front portion 10 of the heat sink member 9. The main reflector 2 is shaped like a quadrant of an elliptical surface. In other words, a frontal portion and a lower portion of the main reflector 2 open, whereas an upper portion, a rear portion, and both of the left and right portions, of the main reflector 2, are closed.

A process such as aluminum vapor deposition or silver coating are applied to concave interior faces of the closed portions of the main reflector 2, and a convergent reflecting surface 12 is provided thereon. The convergent reflecting surface 12 is a reflecting surface based upon an elliptical face, for example, a free curved face (NURBS-curved face) based upon a rotating elliptical face or an ellipse (a reflecting surface, which forms an elliptical face at the vertical cross-sectional views of FIGS. 4 and 5, and forms a parabolic face or a modified parabolic face at the horizontal cross-sectional view, although not shown). Thus, the convergent reflecting surface 12 has: a first focal point F1 (basic focal point of the main reflector); a second focal point F2 (focal line on the horizontal cross section, namely focal line, in other words, viewing from the top (plane), both ends of which are positioned at the side of the projecting lens 4 and a center of which is positioned at the side of the semiconductor-type light source 3); and an optical axis connecting the first and second focal points F1 and F2 to each other. The optical axis of the convergent reflecting surface 12 is coincident (substantially coincident) with the Z-axis.

The semiconductor-type light source 3 uses a self-luminous semiconductor-type light source such as an LED or an EL (organic EL) (an LED in the embodiment). The semiconductor-type light source 3 is made of: a board 13 as a thermally conductive insulation board (ceramic board, for example); a light emitting chip 14 as a very small rectangular (square-shaped or oblong-shaped) LED chip provided on one face (top face) of the board 13; and a hemisphere-shaped (dome-shaped) optically transparent member (lens, sealing resin member) 15, covering the light emitting chip 14.

The board 13 of the semiconductor-type light source 3 is fixed on a fixing face (top face) of the front portion 10 of the heat sink member 9. A center O of the light emitting chip 14 of the semiconductor-type light source 3 is positioned at or near the first focal point F1 of the convergent reflecting surface 12. The X, Y, and Z axes are orthogonal coordinate axes in a state in which the center O of the light emitting chip 14 is employed as an origin.

A normal line passing through the center O of the light emitting chip 14 is coincident (substantially coincident) with the Y axis with respect to the Z axis (reference axis). The Y axis of the normal line is orthogonal to the Z axis (reference axis). The semiconductor-type light source 3 is disposed so that the normal line passing through the center O of the light emitting chip 14 is orthogonal to the Z axis (reference axis). In this manner, a light emission surface of the light emitting chip 14 is in an upward direction of the Y axis, and is oriented to the convergent reflecting surface 12 of the main reflector 2.

In addition, in the case where the light emitting chip 14 is formed in a rectangular shape, a long side of the light emitting chip 14 is parallel to the X axis or is slightly inclined with respect to the X axis.

On the other hand, the main reflector 2 is disposed so that the radiated light L1 in the hemispherical direction of the light emitting chip 14, namely in the upward direction with respect to a flat plate including the X and Y axes in the embodiment, is incident to the convergent reflecting surface 12.

The projecting lens 4 is a convex lens which is employed as a non-spherical lens. A frontal side (external side) of the projecting lens 4 is shaped like a convex non-spherical face with a large curvature (small radius of curvature), whereas a backside (the side of the semiconductor-type light source 3) of the projecting lens 4 is shaped like a flat non-spherical face (plane). The backside of the projecting lens 4 may be a convex non-spherical face with a small curvature. By using the projecting lens 4 or the like, a focal point distance of the projecting lens 4 is reduced, and the projecting lens 4 of the vehicle headlamp 1 in the embodiment become compact in dimensions relative to an optical axis (the Z-axis direction), accordingly.

The projecting lens 4 has a foreside focal point (focal point at the side of the semiconductor-type light source 3) and a backside focal point (external focal point); and an optical axis connecting the foreside and backside focal points to each other. The axis of the projecting lens 4 is coincident (substantially coincident) with the optical axis of the convergent reflecting surface 12 and the Z axis. The foreside focal point of the projecting lens 4 is a lens focal point FL (meriodinal image face which is a focal face of the object space, basic focal point of the projecting lens). The lens focal point FL of the projecting lens 4 is positioned at or near a second focal point F2 of the convergent reflecting surface 12.

Figure 7:
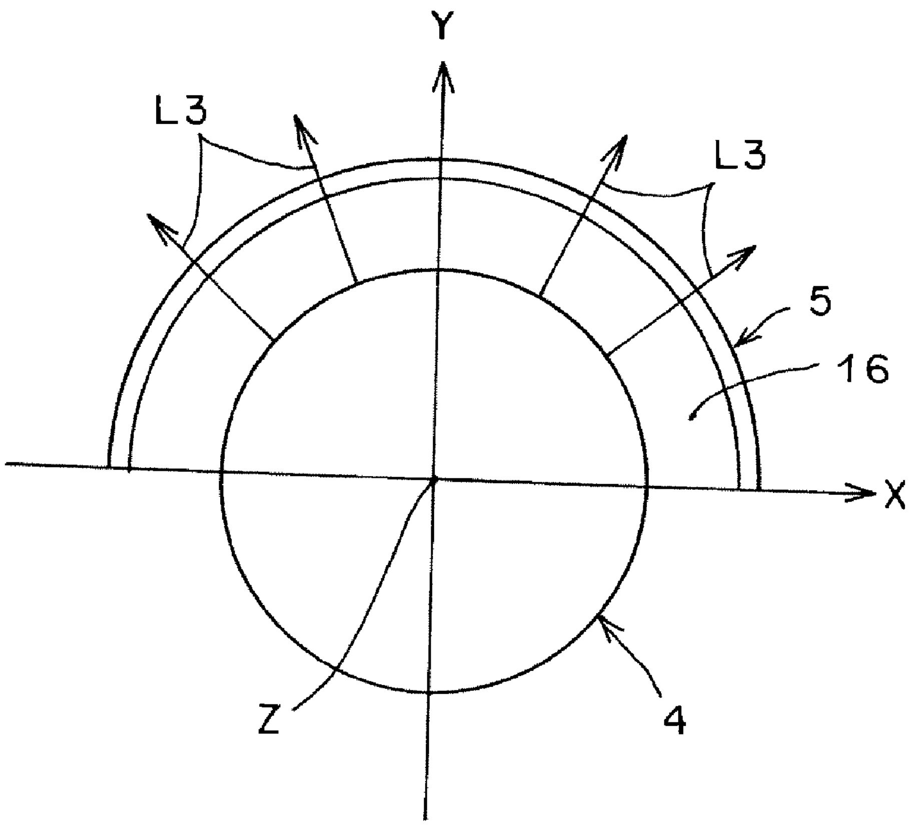
FIG. 7 is a front view of a projecting lens and an auxiliary reflector, showing an optical path for reflection light from a parabola-type reflecting surface, similarly.

The projecting lens 4, as shown in FIG. 7, is fixed to a holder or a frame, although not shown (hereinafter, simply referred to as a "holder") at a portion which is downward with respect to a plane including the X and Z axes. The holder is fixed to the heat sink member 9.

Light L1, which is radiated from the semiconductor-type light source 3, does not have a high heat, so that a resin-based lens can be used as the projecting lens 4. The projecting lens 4 is acrylic in the embodiment. The projecting lens 4 is intended to illuminate (project) basic light distributions WP1, WP2 of a light distribution pattern LP for low beam, having the cutoff lines CL1, CL2, CL3, and the light distribution pattern HP for high beam, toward a forward direction of a vehicle.

Like the main reflector 2, the auxiliary reflector 5 is made up of a resin member or a metal member and the like, with optically opaque properties and thermal conductivity. The auxiliary reflector 5 is disposed between the main reflector 2 and the projecting lens 4, and is fixed to the main reflector 2 or the heat sink member 9. The auxiliary reflector 5 is formed in a partial shape of a parabola face. In other hands, a forward portion, a lower portion, and a rear portion of the auxiliary reflector 5 opens, whereas an upward portion and both of the left and right portions of the auxiliary reflector 5 is closed.

A process such as aluminum vapor deposition or silver coating is applied to concave interior faces of the closed portions of the auxiliary reflector 5, and a parabolic reflecting surface 16 is provided thereon. The parabolic reflecting surface 16 is a reflecting surface based upon a parabola face, for example, a reflecting surface such as a free curved face (NURBS-curved face) based upon a rotating parabola face. Thus, the parabolic reflecting surface 16 has a focal point F3 (basic focal point of the auxiliary reflector) and an optical axis passing through the focal point F3.

The focal point F3 of the parabolic reflecting surface 16 is positioned at or near the first focal point F1 of the convergent reflecting surface 12. In addition, the optical axis of the parabolic reflecting surface 16 is coincident (substantially coincident) with the Z axis. The parabolic reflecting surface 16 is a reflecting surface for reflecting radiated light L2 from the semiconductor-type light source 3, which is disallowed to be targeted for light distribution on the convergent reflecting surface 12, as a spot light distribution SP of the light distribution pattern HP for high beam, without passing through the projecting lens 4.

Figure 5:
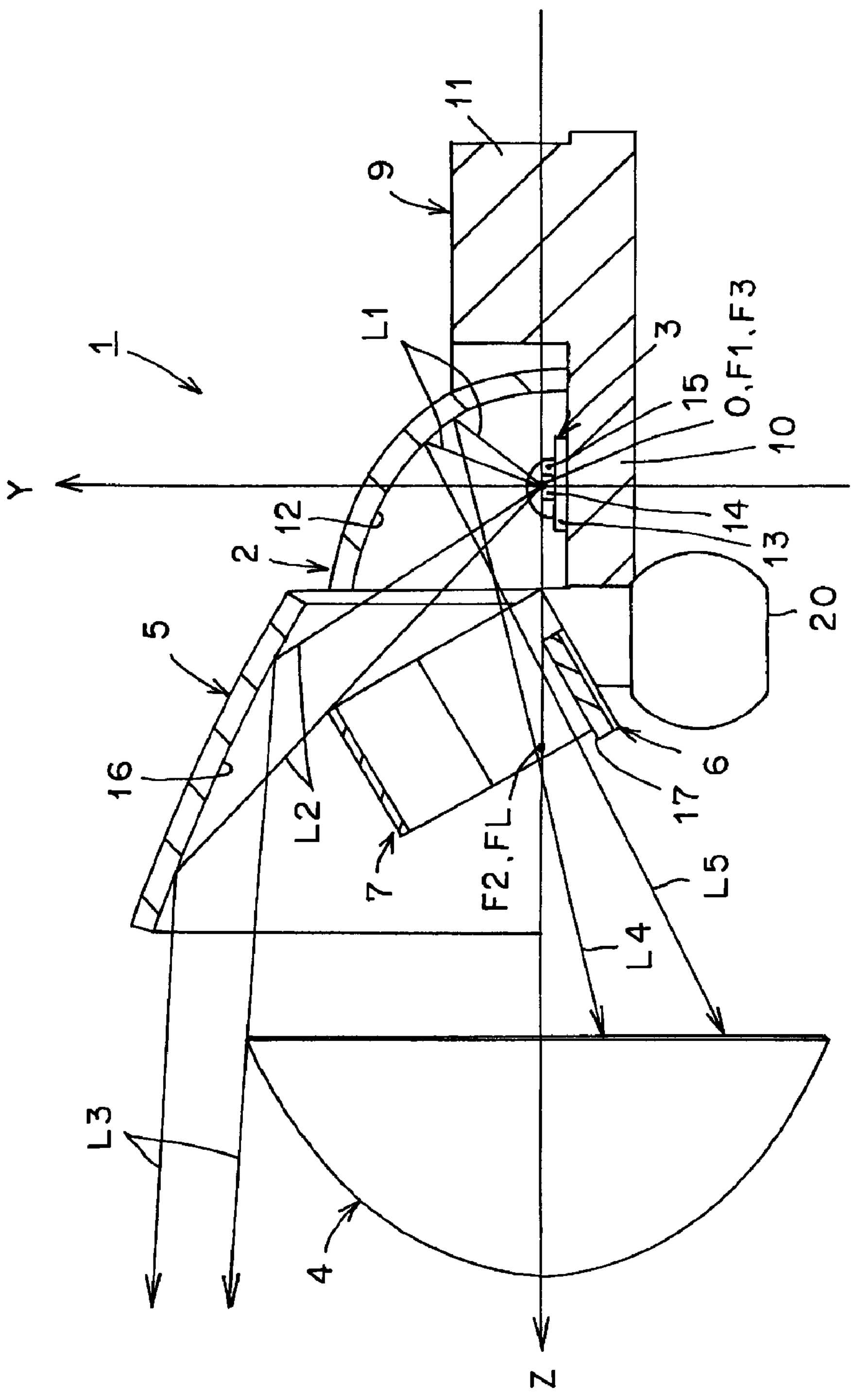
FIG. 5 is a longitudinal cross-sectional view (vertical cross-sectional view) showing an optical path when the shade and the light shading member structured integrally with each other are positioned in the second location, similarly.

The radiated light L2 from the semiconductor-type light source 3, which disallowed to be targeted for light distribution on the convergent reflecting surface 12, is referred to as radiated light from the semiconductor-type light source 3, which is not incident to the projecting lens 4, even if the radiated light L2 is reflected after being incident to the convergent reflecting surface 12, and which neither contributes to light distribution nor is used therefor. In addition, reflected light L3 from the parabolic reflecting surface 16, as shown in FIGS. 5 and 7, is illuminated toward the forward direction from between the projecting lens 4 and the auxiliary reflector 5, which are upward with respect to a plane including the X and Z axes.

The shade 6 is made of an optically opaque member, and is shaped like a flat plate. The shade may not be shaped like such flat plate as long as desired cutoff lines are obtained. An edge 17, forming the elbow point E and the cutoff lines CL1, CL2, CL3, is provided at the shade 6.

The light shading member 7 is made of an optically opaque member, like the shade 6. The light shading member 7 is shaped like a ring so that the reflected light L4 from the convergent reflecting surface 12 is disallowed to be hindered from being incident to the projecting lens 4.

The shade 6 is structured integrally with the light shading member 7. The shade 6 is between the semiconductor-type light source 3 and the projecting lens 4, and is disposed to be movable between a first location (the location in the state shown in FIGS. 1, 2, and 4) and a second location (the position in the state shown in FIGS. 3 and 5). On the other hand, the light shading member 7 is between the semiconductor-type light source 3 and the auxiliary reflector 5, and is disposed to be movable between a first location (the location in the state shown in FIGS. 1, 2, and 4) and a second location (the position in the state shown in FIGS. 3 and 5).

The shade 6 and the light shading member 7 that are structured integrally with each other are parallel to an X axis (the axis orthogonal to a normal line (Y axis) and a reference axis (Z axis) passing through a center O of the light emitting chip 14), and are disposed to be rotationally movable between the first and second locations around an shaft 18 positioned in a location in a backward direction (close to a first focal point F1 of the convergent reflecting surface 12) with respect to the Z axis from a second focal point F2 of the convergent reflecting surface 12.

In other words, a shaft member 19 is fixed at both of the left and right sides of the light shading member 7 structured integrally with the shade 6. The shaft member 19 is rotatably held on the holder. A shaft center of the shaft member 19 is coincident with the shaft 18.

The shade 6, when it is positioned in the first location, is intended to cut off a part L5 of the reflection light L4 that is radiated from the semiconductor-type light source 3 and reflected on the convergent reflecting surface 12, thereby forming a light distribution pattern LP for low beam, having the cutoff lines CL1, CL2, CL3 by means of the edge 17. In addition, the shade 6, when it is positioned in the second location, is intended to form basic light distributions WP1, WP2 of the light distribution pattern HP for high beam, by means of the reflection light beams L4, L5 that are radiated from the semiconductor-type light source 3 and reflected on the convergent reflecting surface 12.

The light shading member 7, when it is positioned in the first location, is intended to shade radiated light L2 from the semiconductor-type light source 3, which is disallowed to be targeted for light distribution on the convergent reflecting surface 12, and is to be incident to the parabolic reflecting surface 16. In addition, the light shading member 7, when it is positioned in the second location, is intended to allow the radiated light L2 from the semiconductor-type light source 3, which is disallowed to be targeted for light distribution on the convergent reflecting surface 12, to be incident to the parabolic reflecting surface 16.

The switching device 8 is intended to switch a current light distribution pattern to switching the shade 6 and the light shading member 7 that are structured integrally with each other to the first location and the second location respectively, thereby switching a current switch to a respective one of the light distribution pattern LP for low beam, having the cutoff lines CL1, CL2, CL3, and the light distribution pattern for high beam HP, having the spot light distribution SP. The switching device 8 is disposed to be opposite to the main reflector 2 in a state in which the semiconductor-type light source 3 is sandwiched therebetween.

Figure 6:
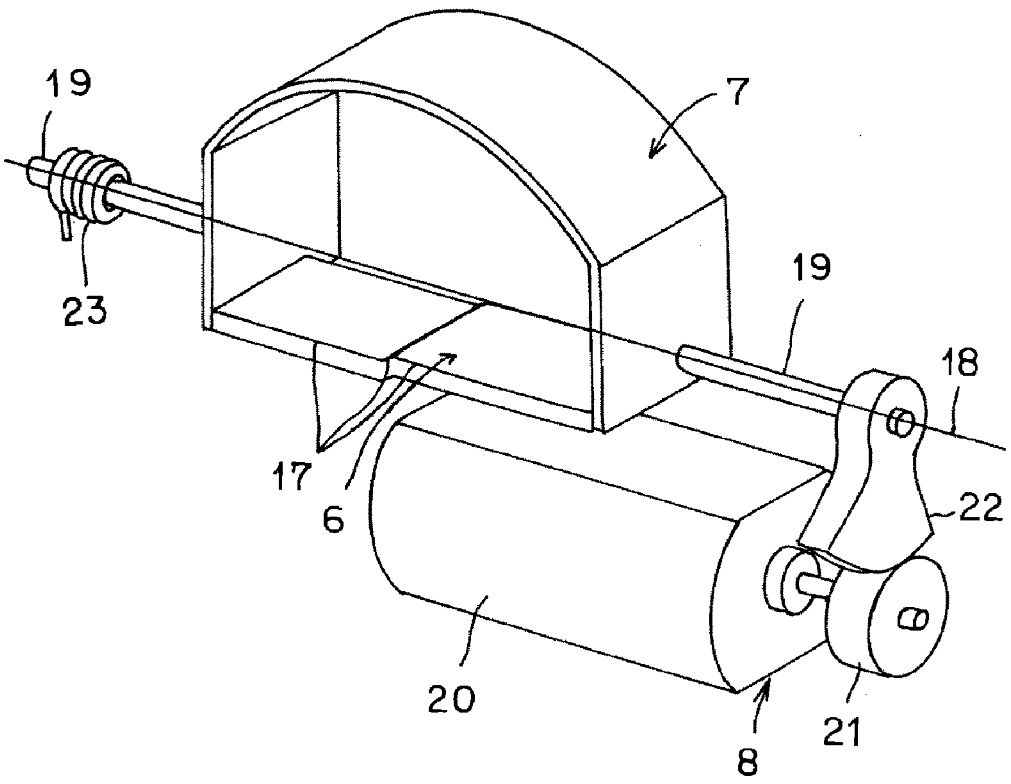
FIG. 6 is a perspective view showing the shade and the light shading member structured integrally with each other and a switching unit, similarly.

The switching device 8, as shown in FIG. 6, is provided with a motor 20, a first gear 21, a second gear 22, and a spring 23 for fail-safe (restoration). The motor 20 is fixed to the holder or the heat sink member 9.

The first gear 21 is fixed to a rotary shaft (drive shaft) of the motor 20. The second gear 22 is fixed to the shaft member 19. The first gear 21 and second gear 22 are meshed with each other. A rotational diameter of the first gear 21 is smaller than that of the second gear 22. The rotational speed of the gears is thereby decelerated.

The spring 23 is a coil spring in the embodiment. The spring 23 engages with the shaft member 19 from the outside. One end of the spring 23 engages with a fixing-side member such as the heat sink member 9. In addition, the other end of the spring 23 is engaged with a rotation-side member such as the light shading member 7. The spring 30 may also be of a kind other than the coil spring as long as it works appropriately.

Stoppers (not shown) for positioning the shade 6 and the light shading member 7 that are structured integrally with each other in the first location and the second location are provided at a fixing-side member such as the holder or the heat sink member 9 and a rotation-side member such as the light shading member 7, respectively.

The vehicle headlamp 1 of the embodiment is made of the abovementioned constituent elements, and hereinafter, functions of these constituent elements will be described.

Figure 2:
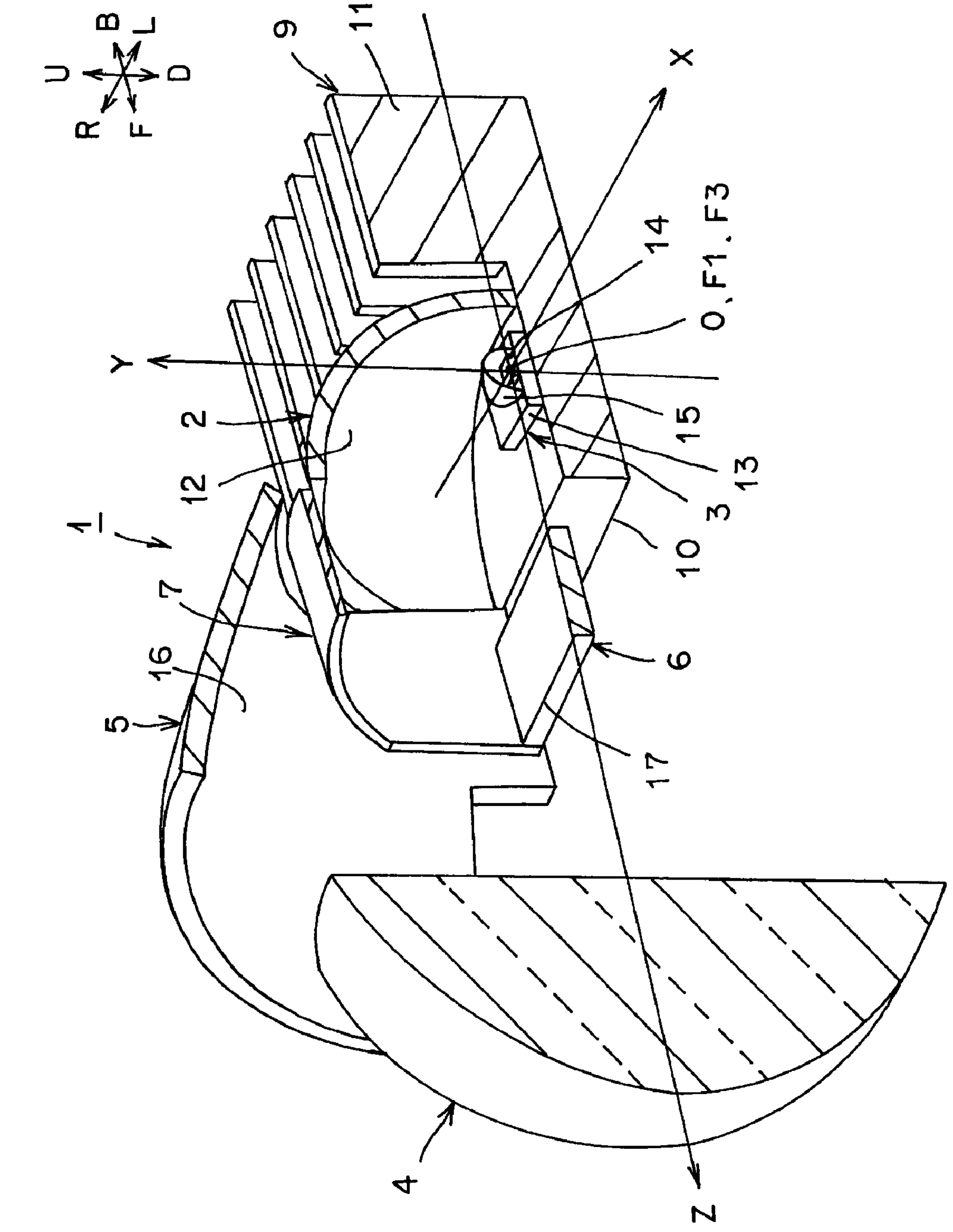
FIG. 2 is a partially cross-sectional perspective view showing a state in which a shade and a light shading member structured integrally with each other are positioned in a first location, similarly.
Figure 3:
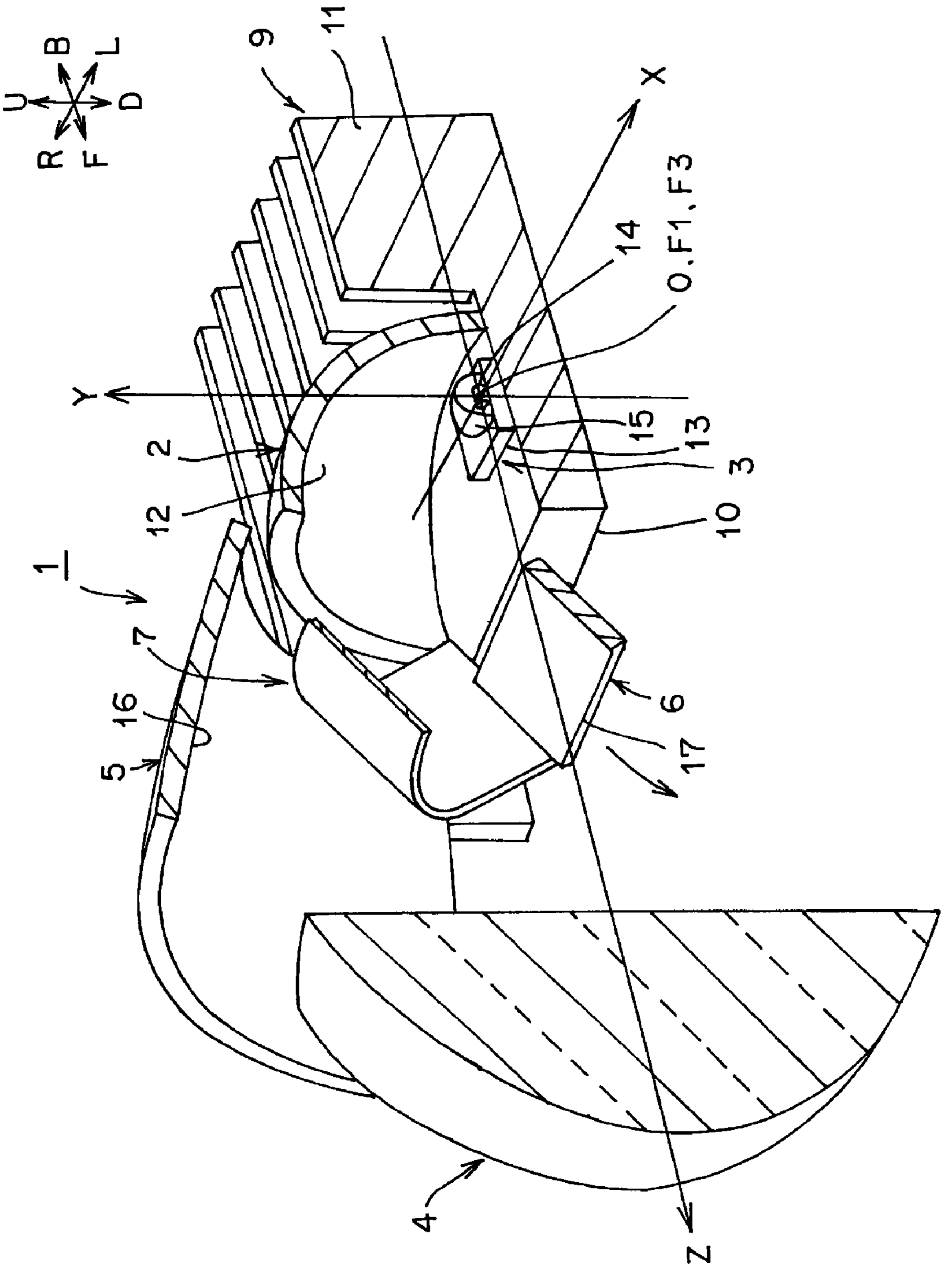
FIG. 3 is a partially cross-sectional perspective view showing a state in which the shade and the light shading member structured integrally with each other are positioned in a second location, similarly.
Figure 4:
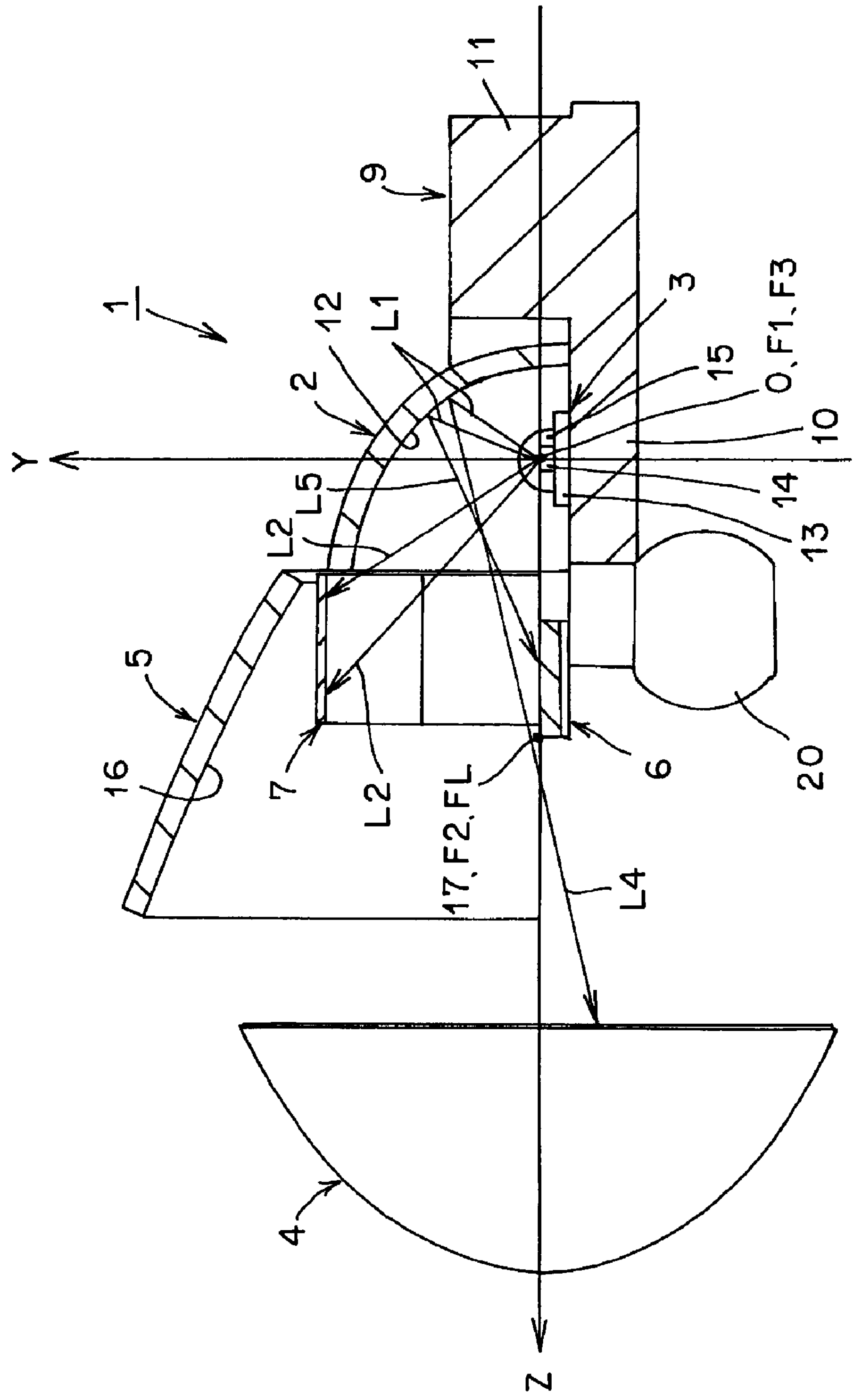
FIG. 4 is a longitudinal cross-sectional view (vertical cross-sectional view) showing an optical path when the shade and the light shading member structured integrally with each other are positioned in the first location, similarly.

In a state in which no power is supplied to the motor 20, the stoppers then work, as shown in FIGS. 1, 2, and 4, due to a spring force of the spring 23 of the switching device 8, and the shade 6 and the light shading member 7 that are structured integrally with each other are positioned in the first location by means of the stopper.

In this state, a light emitting chip 14 of the semiconductor-type light source 3 of the vehicle headlamp 1 is lit to emit light. Afterward, light beams L1, L2 are radiated from the light emitting chip 14 of the semiconductor-type light source 3. A part L1 of the radiated light beams is incident to the convergent reflecting surface 12, and is reflected on the convergent reflecting surface 12, and the reflected light beams L4, L5 converge (concentrate) near a second focal point F2 of a convergent reflecting surface 8. A part L5 of the reflected light beams converging (concentrating) near the second focal point F2 is cut off by means of the shade 6 that is structured integrally with the light shading member 7, and is positioned in the first location. Further, the cutoff lines CL1, CL2, CL3 are formed by means of the edge 17 of the shade 6. On the other hand, the reflected light L4 that has not been cut off by means of the shade 6 so far advances toward the projecting lens 4 as is.

The reflected light L4, having advanced toward the projecting lens 4, passes through the projecting lens 4; is projected toward the forward direction of the vehicle, as an image obtained by vertically and horizontally inverting an image of the light at the lens focal point FL of the projecting lens 4, namely as a light distribution pattern LP for low beam, having the cutoff lines CL1, CL2, CL3, shown in FIG. 8; and illuminates a road surface or the like.

At this time, the radiated light L2 from the semiconductor-type light source 3, which is disallowed to be targeted for light distribution on the convergent reflecting surface 12, is shaded by means of the light shading member 7 that is structured integrally with the shade 6 and positioned in the first location. This light is disallowed to be incident to the parabolic reflecting surface 16 of the auxiliary reflector 5. As a result, a spot light distribution SP of the light distribution pattern HP for high beam, shown in FIG. 9, is disallowed to be illuminated as the light distribution pattern LP for low beam, having the cutoff lines CL1, CL2, CL3, shown in FIG. 8.

Next, power is supplied to the motor 20 of the switching device 8. Afterward, the motor 20 is driven, and the first gear 21 and the second gear 22 rotate, respectively. Concurrently, the shaft member 19 that is fixed to the second gear 22 rotates against the spring force of the spring 23. The shade 6 and light shading member 7 structured integrally with each other, which are fixed to the shaft member 19, rotate from the first location shown in FIGS. 1, 2, and 4 to the second location, shown in FIGS. 3 and 5 (refer to the location indicated by the arrow drawn in the solid line of FIG. 3). The stoppers then work, whereby the shade 6 and light shading member 7, which are structured integrally with each other, are replaceably positioned from the first location to the second location.

When the shade 6 is positioned in the second location, the reflected light L5 from the convergent reflecting surface 12, which has been cut off by means of the shade 6 so far, advances toward the projecting lens 4 as is, together with the reflected light L4 that has not been thereby cut off so far.

Afterward, the reflected light beams L4, L5, having advanced toward the projecting lens 4, pass through the projecting lens 4; are projected toward the forward direction of the vehicle, as an image of the light, which is obtained by vertically or horizontally inverting an image of the light at the lens focal point FL of the projecting lens 4, namely as basic light distributions WP1, WP2 of the light distribution pattern HP for high beam, shown in FIG. 9; and illuminate a road surface or the like. The basic light distribution WP1 of the light distribution pattern HP for high beam, shown in FIG. 9, is a light distribution of a portion which is downward with respect to the dotted line of FIG. 9, the light distribution being formed by means of the reflected light L4 that has not been cut off by means of the shade 6 so far, and utilizes a light distribution pattern LP for low beam, shown in FIG. 8, as is. On the other hand, the basic light distribution WP2 of the light distribution pattern HP for high beam, shown in FIG. 9, is a light distribution of a portion which is upward with respect to the dotted line of FIG. 9, the light distribution being formed utilizing the reflected light L5 that has been cut off by means of the shade 6 so far, and the basic light distribution pattern WP2 distributed above the cutoff lines CL1, CL2, CL3 of the light distribution pattern LP for low beam, shown in FIG. 8.

At this time, the light shading member 7 that is structured integrally with the shade 6 is also positioned in the second location, so that the radiated light L2 from the semiconductor-type light source 3, which is disallowed to be targeted for light distribution on the convergent reflecting surface 12, the light having been shaded by means of the light shading member 7, is incident to the parabolic reflecting surface 16 of the auxiliary reflector 5, and is reflected on the parabolic reflecting surface 16. The reflected light L3 is illuminated toward the forward direction of the vehicle from between the projecting lens 4 and the auxiliary reflector 5, as a spot light distribution SP of the light distribution pattern HP for high beam, shown in FIG. 9, without passing through the projecting lens 4. In this manner, the light distribution pattern HP for high beam, shown in FIG. 9, utilizes the reflected light L5 and the radiated light L2 (i.e., direct light) that have not been utilized upon emission of the light distribution pattern LP for low beam, shown in FIG. 8, so that a sufficient amount of light is obtained.

A main optical axis SZ is defined at a center of the spot light distribution SP of the light distribution pattern HP for high beam, shown in FIG. 9. The main optical axis SZ is defined at the upside with respect to an elbow point E of the light distribution pattern LP for low beam, shown in FIG. 8, and is positioned at or near a crossing point between a horizontal line HL-HR and an upside-downside vertical line VU-VD of a screen. Since the spot light distribution SP, including the main optical axis SZ, is formed by means of: the semiconductor-type light source 3, which is fixed to the heat sink member 9; and the parabolic reflecting surface 16 of the auxiliary reflector 6, which is fixed to a main reflector 2 or the heat sink member 9, the position of the spot light distribution SP including the main optical axis SZ is fixed without being shifted. As a result, a portion, namely an important portion (point) of the spot light distribution SP, including the main optical axis SZ of the light distribution pattern HP for high beam, does not vary, so that desired light distribution characteristics are obtained as per the relevant light distribution design.

Power supply of the switching device 8 to the motor 20 is then shut off. Afterward, the first gear 21 and the second gear 22 are adapted to reversely rotate, respectively, due to the spring force of the spring 23. Concurrently, the shaft member 19 that is fixed to the second gear 22 reversely rotates. Due to the reverse rotation of the shaft member 19, the shade 6 and light shading member 7 structured integrally with each other, both of which are fixed to the shaft member 19, are adapted to rotate from the second location shown in FIGS. 3 and 5 to the first location shown in FIGS. 1, 2, and 4. The stoppers then work, and the shade 6 and light shading member 7, which are structured integrally with each other, are thereby replaceably positioned from the second location to the first location.

In addition, when the shade 6 and light shading member 7, which are structured integrally with each other, are positioned in the second location or rotationally move from the first location to the second location, if power supply of the switching device 8 to the motor 20 is shut off (if power supply is shut off), the shade 6 and light shading member 7, which are structured integrally with each other, are restored to the first location by means of spring force of the spring 23. Thus, the light distribution pattern HP for high beam, shown in FIG. 9, can be switched to the light distribution pattern LP for low beam, shown in FIG. 8. In this manner, a fail-safe function works.

In such a manner as described above, the light distribution pattern LP for low beam, shown in FIG. 8, and the light distribution pattern for high beam HP, shown in FIG. 9, are illuminated toward the forward direction of the vehicle.

The vehicle headlamp 1 of the embodiment is made of the abovementioned constituent elements and functions, and hereinafter, advantageous effect thereof will be described.

The vehicle headlamp 1 of the embodiment is provided in such a manner that: when the shade 6 and the light shading member 7 are switched to the first location by means of the switching device 8, the radiated light L1 from the light emitting chip 14 of the semiconductor-type light source 3 is reflected on the convergent reflecting surface 12; and converges near the second focal point F2 of the convergent reflecting surface 12 (focal point FL of the projecting lens 4). Afterward, a part L5 of the reflected convergent light is cut off by means of the shade 6 that is positioned in the first location, and the remaining convergent light L4 is illuminated toward the forward direction of the vehicle from the projecting lens 4, as the light distribution pattern LP for low beam, having the cutoff lines CL1, CL2, CL3. At this time, the radiated light L2 from the semiconductor-type light source 3, which is disallowed to be targeted for light distribution on the convergent reflecting surface 12, is shaded by means of the light shading member 7 that is positioned in the first location. The shaded light is disallowed to be incident to the parabolic reflecting surface 16 of the auxiliary reflector 5. As a result, the spot light distribution SP of the light distribution pattern HP for high beam, shown in FIG. 9, is disallowed to be illuminated as the light distribution pattern LP for low beam, having the cutoff lines CL1, CL2, CL3, shown in FIG. 8.

In addition, when the shade 6 and the light shading member 7 are replaceably positioned in the second location by means of the switching device 8, the radiated light L1 from the light emitting chip 14 of the semiconductor-type light source 3, followed by the reflected convergent light beams L4, L5 being reflected on the convergent reflecting surface 12 and converging near the second focal point F2 of the convergent reflecting surface 12 (focal point FL of the projecting lens 4), is illuminated toward the forward direction of the vehicle from the projecting lens 4, as basic light distributions WP1, WP2 of the light distribution pattern HP for high beam as is, without being cut off by means of the shade 6 that is positioned in the second location. At this time, the radiated light L2 from the semiconductor-type light source 3, which is disallowed to be targeted for light distribution on the convergent reflecting surface 12, is incident to, and is reflected on, the parabolic reflecting surface 16 of the auxiliary reflector 5 without being shaded by means of the light shading member 7 that is positioned in the second location. The reflected light is illuminated toward the forward direction of the vehicle from between the projecting lens 4 and the auxiliary reflector 5, as the spot light distribution SP of the light distribution pattern HP for high beam, without passing through the projecting lens 4.

In this manner, the vehicle headlamp 1 employs the semiconductor-type light source 3 as a light source, allowing the light distribution pattern LP for low beam, shown in FIG. 8, and the light distribution pattern HP for high beam, shown in FIG. 9, to be replaceably illuminated toward the forward direction of the vehicle.

In addition, the vehicle headlamp 1 of the embodiment is made of: the main reflector having the convergent reflecting surface 12; the semiconductor-type light source 3; the projecting lens 4; the auxiliary reflector 5 having the parabolic reflecting surface 16; the shade 6: the light shading member 7; and the switching device 8. Thus, in comparison with the conventional vehicle headlamp, the number of components is reduced without requiring the second light source unit for high-beam light distribution pattern; and therefore, downsizing, weight reduction, and cost reduction can be achieved accordingly.

Moreover, the vehicle headlamp 1 of the embodiment utilizes the reflected convergent light L5 that has been cut off by means of the shade 6 so far, to thereby form the basic light distribution WP2 of the light distribution pattern HP for high beam. This vehicle headlamp also effectively utilizes the radiated light L2 from the semiconductor-type light source 3, which is disallowed to be targeted for light distribution on the convergent reflecting surface 12, by means of the parabola reflecting surface 16 of the auxiliary reflector 5 to thereby form the spot light distribution SP of the light distribution pattern HP for high beam. As a result, the vehicle headlamp 1 of the embodiment can obtain the light distribution pattern HP for high beam with its superior distant visibility and can obtain the sense of moderation in switching between the light distribution pattern LP for low beam, having the cutoff lines CL1, CL2, CL3, and the light distribution pattern HP for high beam.

In addition, the vehicle headlamp 1 of the present embodiment uses the semiconductor-type light source 3 from which light is radiated in a hemispherical direction, as a light source. Thus, if the main reflector 2 is disposed so as to allow the radiated light in the hemispherical direction from the semiconductor-type light source 3 to be incident thereto, a portion in the hemispherical direction, which is opposite to that of the radiated light from the semiconductor-type light source 3, is allowed to be an unnecessary portion where no components are present. Therefore, in the vehicle headlamp 1 of the embodiment, the entire vehicle headlamp can be further downsized in spite of a bi-functional vehicle headlamp for switching light distribution patterns by disposing the switching device 8 at a portion which is opposite to the main reflector 2, in a state in which the semiconductor-type light source 3 is sandwiched therebetween.

Further, the vehicle headlamp 1 of the embodiment is provided in such a manner that: the shade 6 and the light shading member 7 are structured integrally with each other, whereby: the number of components can be further reduced; and moreover, the switching device 8 for switching the shade 6 and the light shading member 7 to each other can be used altogether. Therefore, the number of components can be further reduced, and downsizing, weight reduction, power saving, and cost reduction can be achieved accordingly.

Moreover, the vehicle headlamp 1 of the embodiment is provided in such a manner that: the shade 6 and light shading member 7, which are structured integrally with each other, are disposed to be rotatably movable between the first location and the second location in a backside location (the location close to the first focal point F1 of the convergent reflecting surface 12) with respect to the Z-axis direction from the second focal point F2 (lens focal point FL of the projecting lens 4) of the convergent reflecting surface 12. Thus, even if a rotational angle is small between the shade 6 and the light shading member 7, structured integrally with each other, the quantity of the rotational movement increases at a portion at the side of the second focal point F2 (lens focal point FL of the projecting lens 4) of the convergent reflecting surface 12 of the shade 6, namely at a portion of the edge 17 forming the cutoff lines CL1, CL2, CL3 of the light distribution pattern LP for low beam. As a result, the vehicle headlamp 1 of the embodiment is provided in such a manner that, even if the shade 6 is rotated at a small rotational angle, the reflected convergent light L5 is allowed to be reliably cut off or pass through the projector lens 4 without being cut off. In this manner, in the vehicle headlamp of the embodiment, the switching device 8 for rotating the shade 6 and light shading member 7, which are structured integrally with each other, is made compact and inexpensive, and downsizing and cost reduction can be achieved accordingly.

In the foregoing embodiment, the light distribution pattern LP for low beam, was switched to the light distribution pattern HP for high beam or vice versa, a respective one of which was illuminated toward the forward direction of the vehicle. However, in the present invention, in addition to double-switching between the light distribution patterns LP and HP for low and high beams, three or more light distribution patterns may be switched by adding one or more other light distribution patterns thereto. In addition, the light distribution patterns to be switched may be those other than the light distribution patterns LP and HP for low beam and high beam, such as light distribution patterns for mid-beam, expressway, and fog lamp, for example.

In the foregoing embodiment, the cutoff lines of the light distribution pattern LP for low beam were the Z cutoff lines made of the oblique cutoff lines CL1, the upper horizontal cutoff line CL2, and the lower horizontal cutoff line CL3. However, in the present invention, there may be cutoff lines other than the Z cutoff line, for example, a mere horizontal cutoff line or cutoff lines, made of the oblique cutoff line at the cruising lane side in a state in which an elbow point is employed as a boundary, and the horizontal cutoff line at the opposite lane side.

Further, the foregoing embodiment described the vehicle headlamp 1 for left-side cruising lane. However, the present invention is applicable to a vehicle headlamp for right-side cruising lane.

Furthermore, in the foregoing embodiment, the normal line passing through the center O of the light emitting chip 14 of the semiconductor-type light source 3 was coincident (substantially coincident) with the Y axis and the semiconductor-type light source 3 was disposed so that the light emission surface of the light emitting chip 14 of the semiconductor-type light source 3 is oriented in an upward direction, whereas the main reflector 2 was disposed upward with respect to a plane including the X and Z axes so as to allow the radiated light in the hemispherical direction from the semiconductor-type light source 3 to be incident thereto. However, in the present invention, the orientation of the light emission surface of the light emitting chip 14 of the semiconductor-type light source 3 may be changed to any direction other than the upward direction of the Y axis, for example, a lower direction, a rightward direction, an enlarging direction, or an oblique direction. In this case, the disposition direction of the main reflector 2 is also needed to be changed in accordance with the orientation of the light emission surface of the light emitting chip 14 of the semiconductor-type light source 3. In other words, the main reflector 2 is needed to be disposed so as to allow the radiated light in the hemispherical direction from the semiconductor-type light source 3 to be incident thereto.

What is claimed is:

1. A vehicle headlamp, comprising: (i) a main reflector having a convergent reflecting surface based upon an elliptical face; (ii) a semiconductor-type light source which is disposed so that a light emitting chip is positioned at a first focal point of the convergent reflecting surface; (iii) a projecting lens on which a lens focal point is positioned at a second focal point of the convergent reflecting, surface; (iv) an auxiliary reflector which is disposed between the main reflector and the projecting lens; (v) a parabolic reflecting surface based upon a parabolic face, which is disposed at the auxiliary reflector and on which a focal point is positioned at the first focal point of the convergent reflecting surface, for reflecting radiated light from the semiconductor-type light source, which is disallowed to be targeted for light distribution on the convergent reflecting surface, as a spot light distribution of the light distribution pattern for high beam, without passing through the projecting lens; (vi) a shade which is between the semiconductor-type light source and the projecting lens, and is disposed to be movable between a first location and a second location, for cutting off a part of reflection light radiated from the semiconductor-type light source and reflected on the convergent reflecting surface, to thereby form a light distribution pattern having one or more cutoff lines, when the shade is positioned in the first location, and for forming a basic light distribution of the light distribution pattern for high beam by means of the reflection light radiated from the semiconductor-type light source, and reflected on the convergent reflecting surface, when the shade is positioned in the second location; (vii) a light shading member which is between the semiconductor-type light source and the auxiliary reflector, and is disposed to be movable between a first location and a second location, for shading the radiated light from the semiconductor-type light source, which is to be incident to the parabolic reflecting surface, when the light shading member is positioned in the first location, and for allowing the radiated light from the semiconductor-type light source to be incident to the parabolic reflecting surface, when the light shading member is positioned in the second location; and (viii) a switching device for switching the shade and the light shading member to the first location and the second location respectively, thereby switching a current light distribution pattern to a respective one of a light distribution pattern, having one or more cutoff lines, and a light distribution pattern for high beam, having a spot light distribution.

2. The vehicle headlamp according to claim 1, wherein:

the semiconductor-type light source is disposed so that a normal line passing through a center of a light emitting chip is orthogonal to a reference axis;

the main reflector is disposed so that radiated light in a hemispherical direction from the light emitting chip is incident to the convergent reflecting surface; and the switching device is disposed in opposite to the main reflector in a state in which the semiconductor-type light source is sandwiched therebetween.

3. The vehicle headlamp according to claim 1, wherein:

the shade and the light shading member are structured integrally with each other; and are disposed to be rotationally movable between the first location and the second location around an axis which is parallel to an axis orthogonal to a normal line and a reference axis passing through a center of the light emitting chip, and which is positioned in a direction of the first focal point on the convergent reflecting surface from the second focal point on the convergent reflecting surface.

4. A vehicle headlamp comprising: (i) a light source from which light is radiated in a hemispherical direction; (ii) a convergent main reflector which is disposed to allow the radiated light in the hemispherical direction from the light source to be incident thereto, the light source positioned at a first focal point of the convergent main reflector; (iii) a projecting lens on which a lens focal point is positioned in a second focal point of the main reflector; (iv) a parabolic auxiliary reflector, which is disposed between the main reflector and the projecting lens; a focal point of the parabolic auxiliary reflector positioned at the first focal point of the convergent main reflector; (v) a shade and a light shading member which are disposed to be movable between a first location and a second location in between the light shade and the light shading member; (vi) a switching device for switching the shade and the light shading member to the first location and the second location respectively; thereby switching a current light distribution pattern to a respective one of a light distribution pattern having one or more cutoff lines and a light distribution pattern for hi~beam, wherein: when the shade and the light shading member are positioned in the first location by means of the switching device, the light-shading member is adapted to shade the radiated light from the light source; to be incident to the auxiliary reflector, and the shade is allowed to illuminate the light distribution pattern having one or more cutoff lines, which is formed by cutting off a part of reflection light radiated from the light-source and reflected on the main reflector, toward a forward direction of a vehicle; and when the shade and the light shading member are positioned in the second location by means of the switching device, the shade and the light shading member move from the first location to the second location, to thereby ensure that: the reflected light from the main reflector, which is cut off by means of the shade in the first location, is incident to the projecting lens, as a basic light distribution of the light distribution pattern for high beam, without being cut off by means of the shade; the radiated light from the light source which is shaded by means of the light shading member in the first location, is incident to the auxiliary reflector, without being shaded by means of the light shading member; and the radiated light front the light source, which is incident to the auxiliary reflector and is disallowed to be targeted for light distribution on the main reflector, is reflected by means of the auxiliary reflector to the forward direction of the vehicle, as a spot light distribution of the light distribution pattern for high beams, without passing through the projecting lens.

5. The vehicle headlamp according to claim 4, wherein:

the light source is a semiconductor-type light source disposed so that a normal line passing through a center of the light emitting chip is orthogonal to a reference axis; and the switching device is disposed in opposite to the main reflector in a state in which the semiconductor-type light source is sandwiched therebetween.

6. The vehicle headlamp according to claim 4, wherein:

the shade and the light shading member are structured integrally with each other; and are disposed to be rotationally movable between the first location and the second location around an axis which is parallel to an axis orthogonal to a normal line and a reference axis passing through a center of the light emitting chip and is positioned in a direction of the first focal point on the convergent main reflector from the second focal point on the convergent main reflector.

7. The vehicle headlamp according to claim 4, wherein:

the shade allows an edge to be provided to form:

an oblique cutoff line with an upward gradient from an elbow point to a cruising lane side;

an upper horizontal cutoff line which is horizontal from the oblique cutoff line to the cruising lane side; and a lower horizontal cutoff line which is horizontal from the elbow point to an opposite lane side.

8. The vehicle headlamp according to claim 4, wherein:

the shade and the light shading member are formed in an integral structure having optically opaque properties, and are constituted to rotationally move at a relatively small rotational angle in the first location and the second location in between the light source and the projecting lens by means of the switching device;

the light shading member is disposed at the auxiliary reflector side, and is formed in a ring shape so that the reflected light from the main reflector is disallowed to be hindered from being incident to the projecting lens; and the shade is disposed in a location which is opposite to the light shading member.

* * * * *